United States Patent
Hudson et al.

(10) Patent No.: US 6,173,350 B1
(45) Date of Patent: Jan. 9, 2001

(54) SYSTEM AND METHOD FOR WRITING DATA TO A SERIAL BUS FROM A SMART BATTERY

(75) Inventors: Richard A. Hudson, Bell; Thorfinn Thayer, Gainesville, both of FL (US); Syed Rahman, Hillsboro, OR (US); Morland Taylor, Gainesville, FL (US)

(73) Assignee: Eveready Battery Company Inc., St. Louis, MO (US)

( * ) Notice: Under 35 U.S.C. 154(b), the term of this patent shall be extended for 0 days.

(21) Appl. No.: 09/174,509

(22) Filed: Oct. 16, 1998

Related U.S. Application Data

(60) Provisional application No. 60/062,280, filed on Oct. 17, 1997.

(51) Int. Cl.[7] .................................................. G06F 13/00
(52) U.S. Cl. .......................... 710/126; 710/32; 710/240; 714/47; 320/1
(58) Field of Search ........................ 710/240, 126, 710/61, 32, 129, 68; 361/1, 15, 100; 320/1–2, 26; 714/1, 47–49, 52

(56) References Cited

U.S. PATENT DOCUMENTS

| | | | |
|---|---|---|---|
| 3,980,318 | * 9/1976 | Balban | 280/735 |
| 5,572,110 | * 11/1996 | Dunstan | 320/30 |
| 5,742,644 | * 4/1998 | Campana, Jr. | 375/316 |
| 5,790,876 | * 8/1998 | Shima et al. | 713/320 |
| 5,871,858 | * 2/1999 | Thomsen et al. | 429/7 |

* cited by examiner

*Primary Examiner*—Ario Etienne
(74) *Attorney, Agent, or Firm*—Linda Gebauer

(57) ABSTRACT

The present invention provides control bus (SMBus) management and interface for a smart battery system having an SMBus two-wire interface with a clock and data line. Electrostatic discharge protection circuitry which does not have the potential to inadvertently charge a dead battery is provided for the SMBus. SMBus mastering circuitry is also provided to work in conjunction with the SMBus interfacing routines for communications on the bus.

19 Claims, 13 Drawing Sheets

SYSTEM AND METHOD FOR WRITING DATA TO A SERIAL BUS FROM A SMART BATTERY

CROSS-REFERENCE TO RELATED APPLICATIONS

This application claims priority from provisional application Ser. No. 60/062,280, filed Oct. 17, 1997, the disclosure of which is incorporated herein by reference in its entirety.

FIELD OF THE INVENTION

This invention relates to rechargeable batteries and more specifically to a battery system including circuitry to allow the battery to communicate with the system host and charger to provide fuel gauging and charge control as well as reporting other parameters to an intelligent device such as notebook computers, PDAs, cellular phones, and power tools.

BACKGROUND OF THE INVENTION

In the past, batteries (also known as "dumb" cells) provided an unpredictable source of power, since typically, a user of a device powered by a battery had no reliable advance warning that a battery was about to run out. There was no indication of how much time was left so that a user could save data or locate an alternate power source prior to complete discharge of the battery and shutdown of the system. Some electronic products use system hardware in an attempt to evaluate the battery's state of charge, but without the necessary knowledge of the battery's characteristics and history, the information is not reliable or accurate.

Today, through the development of "smart" or "intelligent" battery packs, batteries have become a reliable source of power by providing information to the host system and eventually the user as to the state of charge as well as a wealth of other information. A so-called "smart battery" is equipped with specialized hardware circuitry and software that provide present state, calculated and predicted data to a host (e.g., portable electronic equipment powered by a smart battery which communicates with the smart battery and uses information provided by the battery) under software control. By adding electronic circuitry inside the battery packs, these smart batteries can report, for example, fuel gauge information (i.e., remaining charge or run time before discharge) as well as provide power management information so that the host can make more efficient use of battery energy and prolong battery life.

Designers of smart battery systems have, for some time, custom designed the protocols and data reported by the smart batteries to the host for each new system or battery type. Realizing that the computer and battery industries would greatly benefit from a standard for smart batteries, an open standard was created called the "Smart Battery System" or "SBS" specifications. These specifications define the interfaces necessary to implement an SBS compliant system and include the SYSTEM MANAGEMENT BUS (SMBUS) specification which defines a 2-wire interface through which a battery can communicate with a charger, a system host or other power-related components; the SMART BATTERY DATA (SBD) specification which defines the data set that is communicated by a smart battery such as remaining capacity, full charge capacity, manufacturing data, current, voltage, temperature, etc.; the SMART BATTERY CHARGER (SBC) specification which defines the data that flows across the SMBus between the smart battery and the charger; the SMBUS BIOS specification which defines a standard BIOS interface to the SMBus; and the SMART BATTERY SELECTOR specification which provides a solution for the implementation of multiple-battery systems (Intel/Duracell SBS Specifications, Rev. 1.0, Feb. 15, 1995, incorporated herein by reference, available on the World Wide Web @ http://www.intel.com/IAL/powermgm/powermgm.html and Internet ftp @ ftp.Intel.com/pub/IAL/power_management).

Within the open standard, the SMBus, a control bus separate from the main system data bus, was created to allow a battery to communicate with the system host and the charger. The System Management Bus (SMBus) specification defines the SMBus as a two-wire bus interface through which simple power-related integrated circuits can communicate with the rest of the system, based on Phillips $I^2C$ (a proprietary specification authored by Phillips Semiconductor, as referenced in document # 98-8080-575-01, "The I2C-bus and how to use it.", incorporated herein by reference). The bus is designed to provide point-to-point master controlled transactions and to have multi-master capability. The specification allows for multiple devices to attach to the SMBus through standard slave addresses where information is exchanged through a simple index set specific to each device. The specification also defines the communications protocols available for use by devices on the SMBus. A smart battery can, therefore, communicate with the host and a charger via the SMBus. The advantage of this type of communication interface is that a system using the SMBus can pass messages to and from devices on the bus instead of tripping individual control lines, which reduces pin count and ensures expandability.

The SMBus Specification refers to three types of devices which communicate on the bus: a slave, a master and a host. A slave is a device that is receiving or responding to a command. A master is a device that issues commands, generates clocks, and terminates the transfer. A host is a specialized master that provides the main interface to the system's central processing unit. As an example, when a smart battery needs to inform the host (computer) of an alarm condition or to inform the battery charger about its desired charging scheme, the battery acts as a bus master with write function capabilities. On the other hand, when the battery is requested by the host to provide it with information, the battery acts as a bus slave with read and write capabilities.

Because of the numerous requirements of the SBS specifications (e.g., clock speed, device timeouts, clock stretching, command protocols, error signaling, etc.), most smart batteries are unable to comply 100% with such specifications, either because of hardware or software limitations or system design flaws. Accordingly, there is a need in the art for a smart battery system and interface which is capable of complying with the SBS specifications, especially the bus communication requirements of the SMBus specification.

BRIEF SUMMARY OF THE INVENTION

The present invention provides control bus (SMBus) management and interface for a smart battery system. The SMBus is a two-wire interface, having a clock and data line. Electrostatic discharge protection circuitry which does not have the potential to inadvertently charge a dead battery is provided for the SMBus. SMBus mastering circuitry is also provided to work in conjunction with the SMBus interfacing routines for communications on the bus.

Specifically, the electrostatic discharge (ESD) protection circuitry in a preferred embodiment includes a pair of reverse biased diodes, where one of the diodes is connected to a data line of said smart battery between the external data terminal of the smart battery and an integrated circuit (microprocessor/microcontroller), and where another of the diodes is connected to a clock line of the smart battery between the external clock terminal and the integrated circuit. This ESD protection device does not include any forward-biased diodes which could inadvertently charge a dead battery. The inverting buffers as well as any other circuitry located between the protection diodes and the integrated circuit also do not include any forward-biased diodes for the same reasons. The diodes preferably have a value which is equal to or less than the integrated circuit voltage maximum. A pair of current limiting resistor may also be included in series with the respective clock and data lines.

The SMBus mastering circuitry which works in conjunction with the SMBus interfacing routines for communications preferably includes latching circuitry (e.g., a multivibrator/flip-flop) electrically coupled to the clock and data lines of the SMBus. The latching circuitry is used in conjunction with interfacing/communicationroutines such as the routine for writing data to the bus from the smart battery when the battery is acting as a master. This routine for writing data (e.g., SMBWrite Routine) to the SMBus preferably includes the steps of first checking the bus for an idle condition (e.g. CheckBus Routine), including the step of first arming a clock latch to capture any transmissions which may occur on the clock line. A start condition is next generated followed by sending a byte of data. The routines next check for acknowledgement and then continue to send data bytes until all bytes have been sent. Once complete, a stop condition is generated and the routine is exited with the clock and data lines tristated (output is inactive). The clock latch is then disarmed and if any errors were previously detected, the transmission is terminated.

This SMBus mastering circuitry latching is especially useful when loading a data bit from the microcontroller to the data line to avoid missing transmissions. The microcontroller has a data pin electrically connected to the data line of the serial bus (SMBus) and has a clock pin electrically connected to the clock of the serial bus (SMBus). When the microcontroller loads a data bit onto the data pin, the clock latch is armed to latch any transmissions which may occur. The microcontroller's clock pin is then tristated and a clock signal can be pulsed on the clock line. If a slave device on the bus has exceeded a maximum threshold value (timeout) for pulling the clock line low (seizing control of the clock line), control of the bus is released by the smart battery; otherwise if a slave device on the bus has exceeded a minimum threshold value (timeout) for pulling the clock line low, the bus is reset by the smart battery; otherwise, if none of the timeout thresholds have been exceeded, the clock latch is disarmed. If the data latch electrically coupled to the data line signifies no transmissions have occurred or the desired data corresponds to the loaded data bit, the routine may end signifying a successful transmission; otherwise the clock output line is tristated since arbitration has been lost and an error for lost arbitration can be recorded.

BRIEF DESCRIPTION OF THE DRAWINGS

FIGS. 6A–6H combine to create a flow chart for the process for SMBus communication interface and control, wherein FIG. 6A depicts the start of the SMBwrite routine; FIG. 6B depicts the BSTART macro; FIG. 6C depicts the SendByte macro; FIG. 6D depicts the BITOUT macro; FIG. 6E depicts the BITIN macro; FIG. 6F depicts the BSTOP macro; FIG. 6G depicts the CheckBus macro; and FIG. 6H depicts the PulseCloc routine.

DETAILED DISCLOSURE OF THE INVENTION

The present invention provides control bus (SMBus) management and interface for a smart battery system designed for use in conjunction with an intelligent host device such as a notebook computer, PDA (Personal Digital Assistant/palmtop computer), cellular phone, camcorder or power tool.

Figure 1:
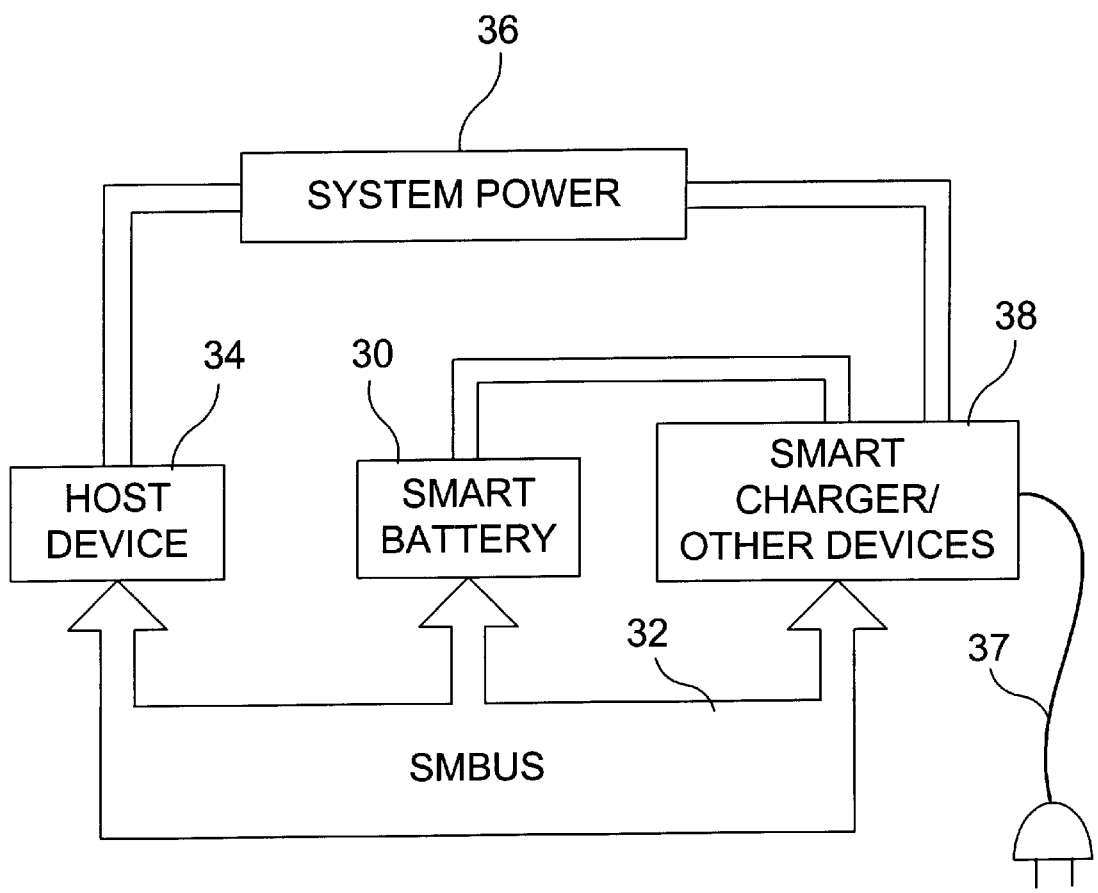
FIG. 1 is a diagrammatic block diagram of a smart battery system connected to a host computer and battery charging device.

A typical smart battery system is illustrated in FIG. 1. The smart battery 30 is connected to a system management bus (SMBus) 32 which can be a two-wire bus based on $I^2C$ (Phillips proprietary) which allows one device to communicate with another device on the bus without the intervention of a host controller. Also connected to the SMBus 32 can be a host system 34, such as a portable computer. The host system 34 may be powered by the battery 30 or a system power supply 36, for example with an AC source 37 (or other source of power). Also connected to the SMBus 32 is a charger 38, for example, a smart charger. A detailed functional description of the SMBus 32 and smart charger 38 can be found in the Intel/Duracell Smart Battery Specification; System Management Bus Specification; Smart Battery Data Specification, (Rev. 1.0, Feb. 15, 1995).

Briefly, in a preferred embodiment, the smart charger 38 (which supports SMBus 1.0 compliant Level II and Level III smart chargers) allows the battery to control its own charge cycle. In a specific embodiment, a Level III smart charger can be utilized. For example, a Level III charger may poll the battery periodically to determine the appropriate charge voltage and current, while a Level II charger must wait for the battery to initiate the data transmission. Optionally, this implementation may prevent the smart battery from supplying power to the rest of the system when the smart battery is fully charged and the system is connected to AC power thus prolonging the life of the battery. The smart charger 38 can also receive critical messages from the smart battery 30 when the smart battery depicts a problem such as alarms for over charge, over voltage, over temperature and temperature increasing too rapidly.

The host system 34 represents a piece of electronic equipment that is powered by the smart battery 30 and that can communicate with the smart battery 30. The host 34 can request information from the battery and then use it in the host system's power management programming and/or use it to provide the user with information about the battery's present state and capabilities. The host 34 can also receive critical messages from the smart battery 30 when it depicts a problem such as those alarms referred to above sent to the smart charger 38. The host can also receive alarms for end of discharge, remaining capacity below the user set threshold value and remaining run time below the user set threshold value.

As explained generally above, and in greater detail below, the smart battery 30 can communicate with the host device 34 and the smart charger 38, over the system management bus (SMBus) 32. Requests are either from the host device to the battery, from the charger to the battery, or, from the battery to either the host or the charger. An example of a typical communication could be for the battery to request a certain charging rate from the charger. The host may also request battery information, such as manufacture date, state of charge, and the like, from the battery.

The smart battery 30 can include a plurality of rechargeable cells which can be of various chemistries, for example, Nickel-Cadmium (NiCad), Nickel Metal Hydride (NiMH), or Lithium Ion (LI-Ion). For the purpose of an illustrative but not limiting example, one embodiment of the smart battery is a Nickel-Metal Hydride Smart Battery Model No. NJ-1020, (available from Eveready Battery Company, Inc.). A suitable multi-pin battery connector (interface plug) is used to connect the battery to a host device or power supply. The terminals generally include negative, temperature, data, clock, positive, and a key.

Figure 3:
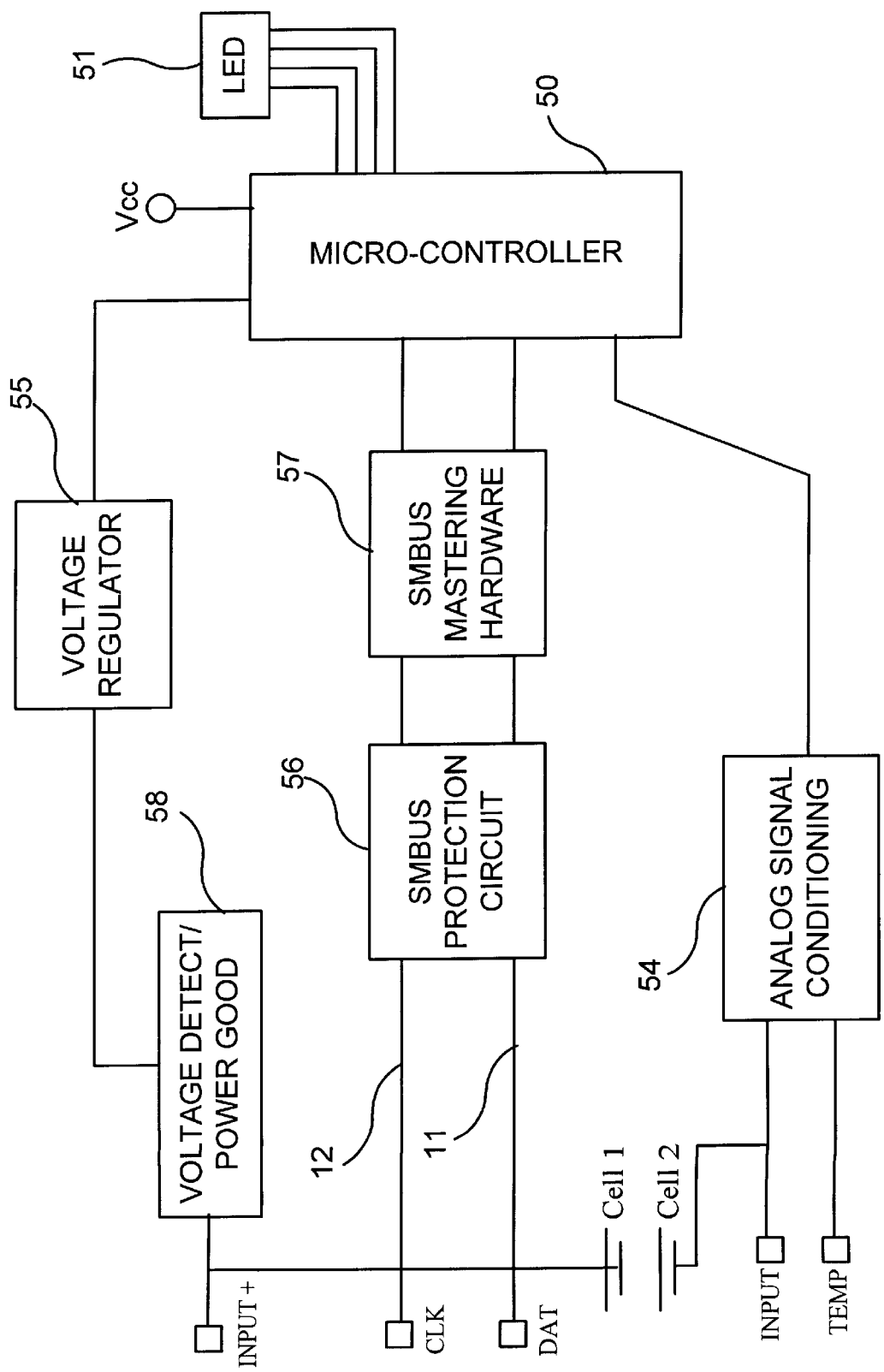
FIG. 3 is a block diagram of the of the smart battery of the present invention.

FIG. 3 shows a simplified smart battery 30 block diagram. The smart battery 30 includes a microcontroller 50 such as the 8-bit PIC14000 28-pin programmable mixed signal controller available from Microchip Technology, Inc. (a detailed description of PIC14000 included in PIC14000 Data Sheet, DS40122B, Microchip Technology, Inc. 1996, is incorporated herein by reference). The microcontroller 50 drives an LED display 51. The smart battery 30 may also include analog signal conditioning circuitry 54, voltage regulation circuitry 55, protection circuitry 56, SMBus mastering/interface circuitry 57, and voltage detection/power good circuitry/charge and current control 58.

Figure 2:
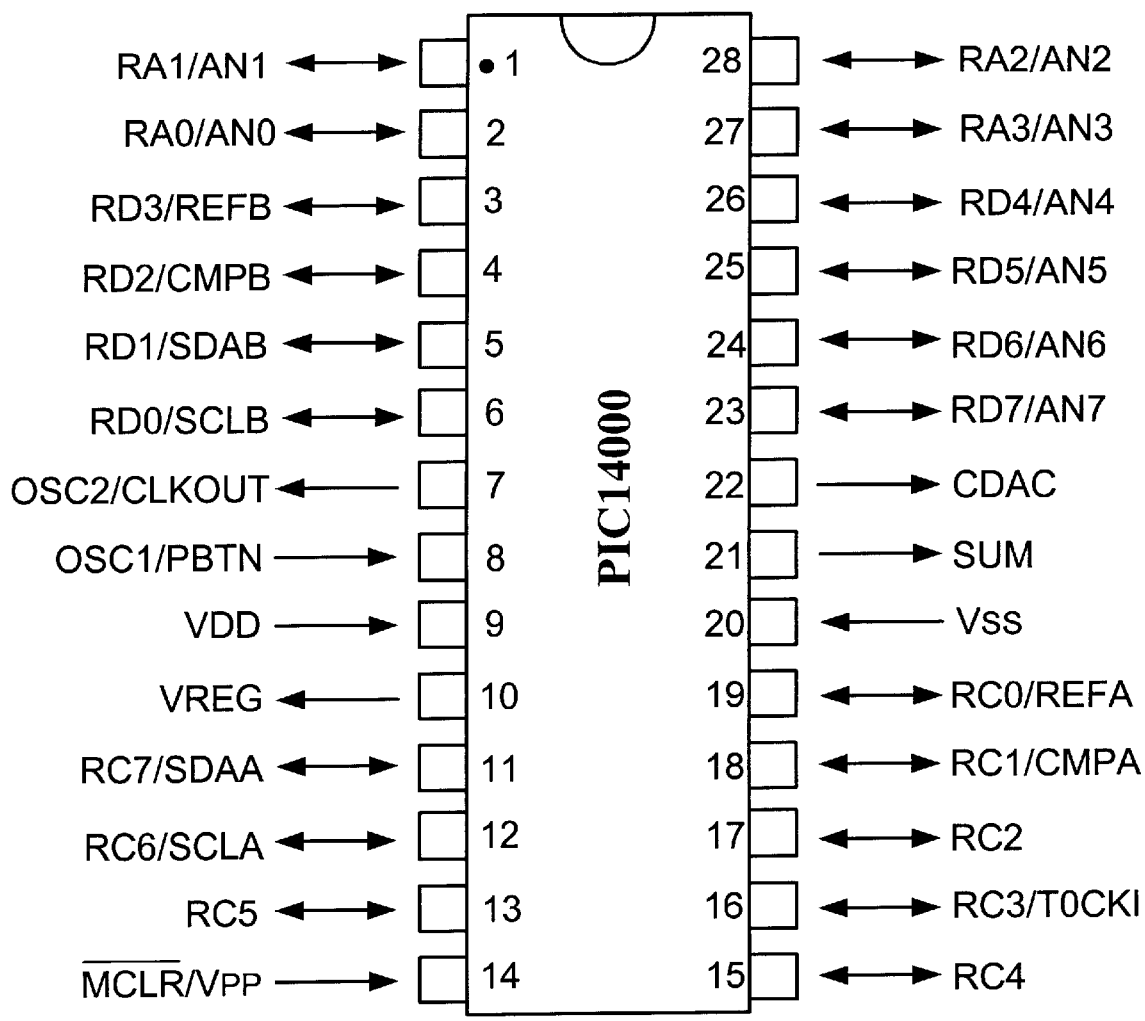
FIG. 2 is a pin diagram of microcontroller of the smart battery.

FIG. 2 shows the pin diagram of the preferred microcontroller 50. Throughout the specification and drawings, the numerals (1–28) representing the lines connected to the pins of the microcontroller 50 are matched with the numbers from the pin diagram (FIG. 2) of such microcontroller for ease of reference. This microcontroller 50 features a medium to high resolution A/D conversion, temperature sensing, closed loop charge control, serial communication, and low power operation utilizing a RISC Harvard architecture CPU with 14-bit instruction and 8-bit data buses. The analog peripherals of the microcontroller 50 include eight external analog input channels, two with level shift inputs, six internal analog input channels, two comparitors with programmable references, a bandgap reference, an internal temperature sensor and a programmable current source. The $I^2C$ serial port through a multiplexer supports two separate $I^2C$ channels. A special oscillator allows either an internal 4 MHZ oscillator or an external crystal oscillator. The microcontroller 50 contains three timers, the Watchdog Timer (WDT), Timer0 (TMR0), and A/D Timer (ADTMR). The Watchdog Timer includes its own on-chip RC oscillator providing protection against software lockup. TMR0 is a general purpose 8-bit timer/counter with an 8-bit prescaler. It may be clocked externally using the RC3/T0CKI pin. An internal low-voltage detect circuit allows for tracking of voltage levels. Upon detecting the low voltage condition, the microcontroller 50 can be instructed to save its operating state and then enter an idle state. An internal band-gap reference is used for calibrating the measurements of the analog peripherals. The calibration factors may be stored in memory such as in EPROM (nonvolatile erasable programmable read-only memory) and can be used to achieve high measurement accuracy. Power savings modes are available (e.g., SLEEP and HIBERNATE) which offer different levels of power savings.

The pin descriptions of the microcontroller 50 as used in the present invention are represented in Table 1 below wherein the pin numbers are matched with the reference numerals (1–28) representing the lines connected to the pins of the microcontroller 50:

TABLE 1

Pin Descriptions

| Pin # | Pine Name | Description |
|---|---|---|
| 1 | RA1/AN1 | Analog Input Channel |
| 2 | RA0/AN0 | Ground |
| 3 LED | RD3/REFB | LED (General Purpose I/O) |
| 4 | RD2/CMPB | General Purpose I/O |
| 5 LED | RD1/SDAB | LED (General Purpose I/O) |
| 6 | RD0/SCLB | General Purpose I/O |
| 7 | OSC2/CLKOUT | IN:output/HS: oscillator/clockout |
| 8 | OSC1/PBTN | IN:input/HS: oscillator input |
| 9 | Vpp | Vcc |
| 10 | VREG | output to control voltage regulation |
| 11 Data | RC7/SDAA (SMB Data) | Serial Data I/O for $I^2C$ |
| 12 Clock | RC6/SCLA (SMB Clk) | Serial Clock I/O for $I^2C$ |
| 13 | RC5 | I/O |
| 14 | MCLR/VPP | Master clear (reset) input |
| 15 | RC4 | I/O |
| 16 | RC3/TOCKI | I/O |
| 17 | RC2 | I/O |
| 18 | RC1/CMPA | Ground |
| 19 | RC0/REFA | Ground |
| 20 | Vss | Ground (Grounds tied together) |
| 21 | SUM | AN1 Summing junction output |
| 22 | CDAC | A/D ramp current source output |
| 23 LED | RD7/AN7 | LED (General Purpose I/O) |
| 24 LED | RD6/AN6 | LED (General Purpose I/O) |
| 25 | RD5/AN5 | Analog input channel 5 |
| 26 | RD4/AN4 | Analog input channel 4 |
| 27 | RA3/AN3 | Analog input channel 3 |
| 28 | RA2/AN2 | Ground |

Figure 4:
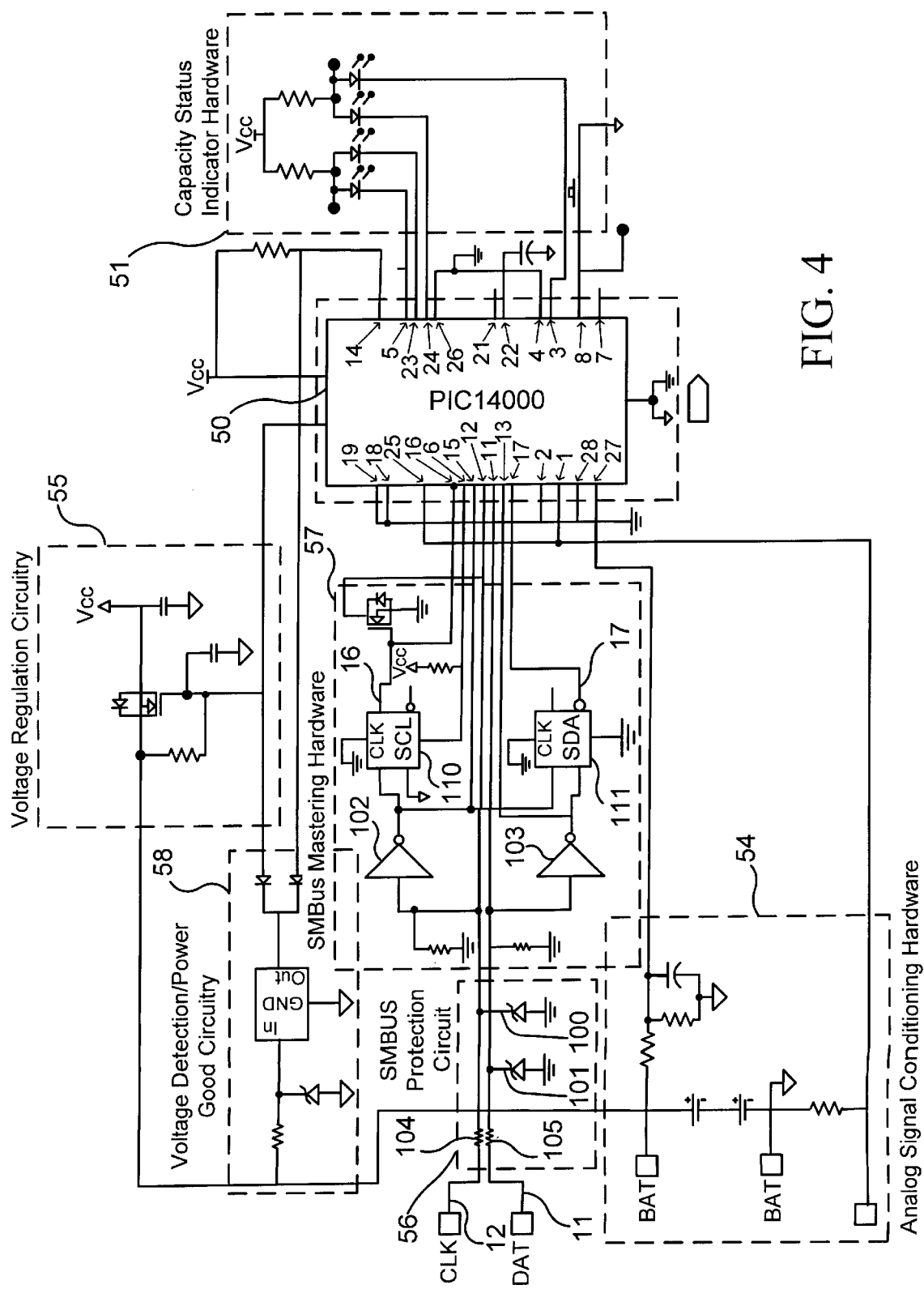
FIG. 4 is a detailed circuit diagram of one embodiment of the smart battery of the present invention.

Referring to the circuit diagram in FIG. 4, a preferred embodiment of the subject invention are shown. This embodiment, the NJ-1020 (available from Eveready Battery Company) can allow for fuel gauging, communication with a host device, and indirect charge control. This circuit diagram details the circuitry and connections between the microprocessor 50, voltage regulator circuit 55, voltage detection/power good circuit 58, analog signal conditioning hardware circuit 54, SMBus protection hardware circuit 56, SMBus mastering hardware circuit 57, and capacity status indicator hardware circuit 51. The functions and interrelation of these circuits are described below.

The microprocessor 50 is powered by the voltage regulation circuit 55. Voltage regulators are used for integrated circuits which require precise and constant supply voltage. This voltage regulator circuit 55 regulates the supply voltage to the microprocessor 50 which provides a low cost approach to be used with the V$_{REG}$ pin 10 of the microprocessor 50. Voltage regulation can be provided by a variety of means well known in the art, including voltage regulator integrated circuits (ICs), diodes, and other external circuitry.

The voltage disconnect/powergood circuit 58 ensures proper power up and power down of the electronic solution when the powering cell stack is being connected or disconnected while charging a low capacity battery. This serves as a virtual disconnect between the battery and electronics for a fully discharged battery to minimize any storage issues when a load is attached. Reset functions are provided by the power good circuitry 58.

The analog signal conditioning circuitry 54 is connected to the analog ports of the microprocessor for analog-to-digital (A/D) conversion preferably through a single slope A/D converter. Other forms of A/D conversion may also be used as known in the art. Since the measurements, such as temperature, voltage and current are in analog form (continuous), and the microcontroller is a digital integrated circuit where all signals must be discrete, noncontinuous values, A/D conversion is necessary for the microcontroller to process the signals/measurements.

If capacity status is desired, the capacity status indicator hardware 51 of the present invention preferably comprises four light emitting diodes (LEDs) [pins 3, 5, 23, 24] along with a push button switch for activation. The LEDs preferably represent 20% capacity per segment. The analog signal conditioning hardware 54 is used for scaling and filtering the battery voltage, temperature and current before analog/digital A/D conversions are completed by the microprocessor 50.

Figure 5A:
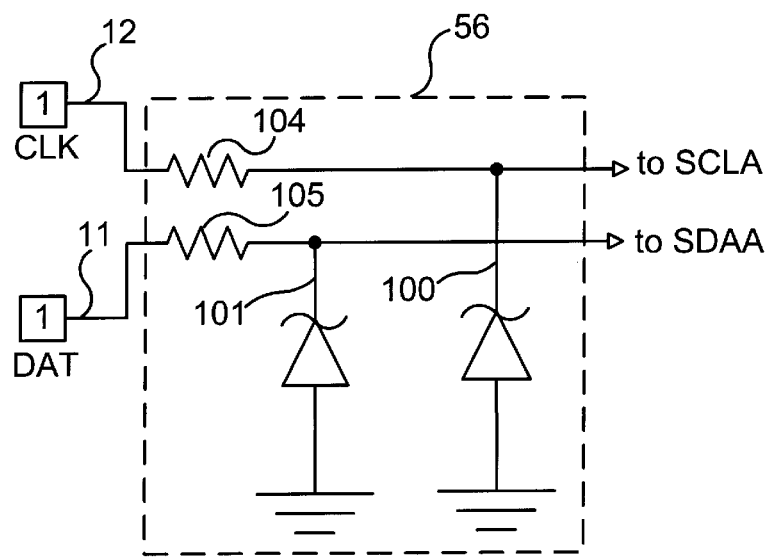
FIG. 5a is a detailed diagram of the ESD protection circuitry of the present invention.

The SMBus protection hardware 56 (FIG. 5a) protects the clock line 12 and data line 11 from electrostatic discharge (ESD) damage. There is a great potential for ESD shock with the exposed pins of the battery. Various forms of diodes are generally used for protection circuitry. A diode is a component with two electrodes. When a diode is "forward-biased," the current flows from the cathode to the anode (the applied voltage is positive). When the diode is "reverse biased," the current flow through the diode remains fairly stable until the point where the reverse breakdown voltage is exceeded. Unlike other smart battery devices which rely on pull-up (forward biased) diodes for ESD protection, in a preferred embodiment, the present invention uses a circuit with pull-down diodes and does not have any ESD protection diodes to Vcc (pull-up diodes). By removing pull-up diodes, the SMBus signal is prevented from charging a dead battery through the pull-up diodes. As shown in FIG. 5a, the present invention retains reverse biased diodes 100, 101 to ground to protect against ESD spikes that go below ground. This allows removal of any forward biased diodes to Vcc (pull-up) and the use of integrated circuits without pull-up diodes. The inverting buffers 102, 103 used also do not have ESD protection (pull-up) to Vcc. If the inverting buffers 102, 103 had pull-up diodes, the battery could also charge through that path.

To prevent ESD damage, in a preferred embodiment, the present invention specifically uses reverse biased zener diodes 100, 101 to clamp any transients above about the breakdown voltage rating of the diode, for example 5.5–5.6 V. Preferably the voltage passes through current-limiting resistors 104, 105 before reaching the zener diodes 100, 101. When the voltage exceeds the breakdown voltage rating of the zener diode, the reverse-biased zener diode starts to conduct. This is called the avalanche point of the diode because the current flow through the device abruptly rises from practically zero to a very high value. It is limited only by the low internal resistance of the zener diode and the external current limiting series resistance. The zener diode effectively sinks any input voltage greater than its reverse-biased avalanche point to ground and the reverse-biased zener diode limits the voltage applied to the load to the breakdown voltage rating. A negative shock will be, for example, clamped only a diode drop below ground and a positive shock will be clamped to about 5.5–5.6 volts, where the zener will break open. The specific breakdown voltage value of the diode preferably would be slightly below the voltage of the IC. Therefore, for example, if the maximum voltage that an integrated circuit/microcontroller could withstand is 6.6 volts, an engineer may choose 5.5 or 5.6 V as a value.

The smart battery may act as a master or a slave depending on the situation. For example, the battery operates in the slave mode when the host communicates with the battery. In this mode, the Host is acting in the role of a bus master, uses the read word, write word, and read block protocols to communicate with the battery (slave). The SMBUS Specification specifically sets forth the necessary HOST-TO-BATTERY messages for SMBUS compliance. Such messages include, for example, RemainingCapacityAlarm( ), AtRate( ), AtRateTimeToFull( ), Temperature( ), Current( ), Voltage( ), MaxError( ), DesignCapacity( ), ManufactureData( ), and the like. For a complete list of SMBus HOST-TO-BATTERY messages see SMBus Specification(Intel/Duracell,Rev. 1.0, Feb. 15, 1995).

The smart battery can also act as a bus master when it communicates with the charger. In this mode, the battery, acting in the role of bus master, uses the write word protocol to communicate with the charger (slave). The SMBUS Specification specifically sets forth the necessary BATTERY-TO-CHARGER messages for SMBUS compliance. Such messages include, for example, ChargingCurrent( ) and ChargingVoltage( ). For a complete list of SMBus Battery-to-Charger messages see SMBus Specification (Intel/Duracell, Rev. 1.0, Feb. 15, 1995).

The battery can also take the role as bus master whenever the battery detects a critical condition (CRITICAL MESSAGES). The SMBUS Specification specifically sets forth the necessary CRITICAL MESSAGES for SMBUS compliance. Such messages include, for example, AlarmWarning( ). When the battery detects this message, the battery can send Alarm Warning( ) messages to the Host and/or Charger. The battery broadcasts the AlarmWarning( ) message at 10 second intervals until the critical condition(s) has been corrected. The SMBUS Specification specifically sets forth the necessary Alarm and Status Bits Definitions for SMBUS compliance. Such bit definitions include, for example, Remaining_Time_Alarm, Over_Temp_Alarm, Terminate_Charge_Alarm, Terminate_Discharge_Alarm, and Remaining_Capacity_Alarm. For a complete list of SMBus Critical Messages and Alarm and Status Bit Definitions, see SMBus Specification (Intel/Duracell, Rev. 1.0, Feb. 15, 1995).

Each of the above-mentioned message schemes has a certain communication protocol defined by the SMBus Specification. The particular protocol is determined by the command. The Specification defines eight possible command protocols for any given device (Quick Command, Send Byte, Receive Byte, Write Byte/Word, Read Byte/Word, process, Block Read, and Block Write). In the Send Byte protocol, for example, all or parts of the Send Byte may contribute to the command. For example, the highest seven bits of the command code might specify access to a feature. The Send Byte Protocol is broken down into the following discrete sections: start condition, slave address, write bit, command code, acknowledge bit, and stop condition. Similarly, in the Write Byte/Word protocols the first byte of a Write Byte/Word access is the command code. The next one or two bytes are the data to be written. For example, a master asserts the slave address followed by the write bit. The device acknowledges and the master delivers the command code. The slave again acknowledges before the master sends the data byte or word. The slave acknowledges each byte according to the $I^2C$ specification, and the entire transaction is finished with a stop condition.

Figure 5B:
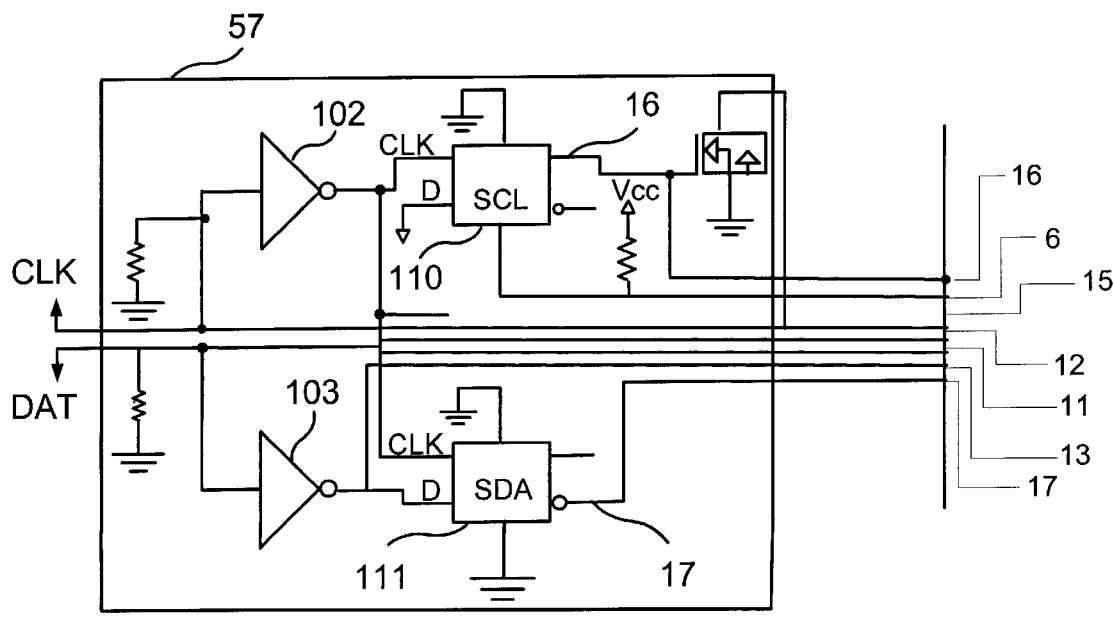
FIG. 5b is a detailed diagram of the SMBus mastering circuitry of the present invention.

All requests and alarm conditions are interfaced via two serial ports SCLA 12 (clock) and SDAA 11 (data) of the microcontroller 50 over the SMBus 32 controlled by the SMBus Mastering circuitry 57 as detailed in FIG. 5b. Since the microcontroller 50 is unable to sample the bus fast enough, an external circuit is required to capture "events" on the SMBUS 32. This SMBUS Mastering circuitry 57 preferably consists of two latching circuits in the form of bistable-multivibrators, preferably D Flip Flops 110, 111, one for each of the SCL 12 and SDA 11 lines. Bistable-multivibrators are often called flip-flops because the output flip-flops back and forth when the circuit is triggered. The flip-flop basically has two output states, either of which can be held high or low as long as power is applied to the circuit. The only way to get the output to change states is to feed a trigger pulse into the input of the circuit. Each time the circuit is triggered, its output jumps to the opposite state. A D-type flip-flop can be made from a JK flip-flop and an inverter. Other suitable types of flip-flops may be used as known in the art. Also the latching function may be accomplished by a shift register or other suitable means. The outputs from the clock and data latch are electrically connected to the microcontroller for processing and are referred to herein as EventCapture, pin 16, and EventData, pin 17, respectively.

The SMBus Mastering circuitry 57 essentially holds the data and forces a BUSY signal until the microcontroller 50 has time to read the captured data and clear the BUSY signal. In this way, a slower discrete sampling system like polling can be used with a fast communications protocol like SMBus.

The SMBUS Mastering circuitry 57 requires firmware (software routines generally stored in ROM) to operate. The SMBUS 32 is a two-wire communication bus consisting of two lines (SCL 12 and SDA 11) which when not in use are pulled high through a resistor. Any device on the bus can directly connect either line to the ground reference to seize the bus. The firmware reads the data and clears the BUSY condition. Both the circuitry and the firmware enhance the arbitration and collision recovery properties of the present invention. Generally, two latches 110, 111 are used to save the states of the SCL (clock) and SDA (data) lines when a synchronous bit is sent in case the latency of the software does not detect the transmitted bit.

Any errors noted during the routines are stored as bits in the b_MasterErrors variable. Such errors include Lost_Arb: lost arbitration during master send; No_Acknowledge: no acknowledge received—command/address unrecognized; Hung: clock locked low—device has timed out >35 msec.; TimeOut: timeout has occurred >25 msec.; and NotIdle: busy conditions.

Referring to FIGS. 6A–6H, a detailed description of the SMBUS mastering routines compatible with the SMBUS communication protocols for providing communications between the battery and an external device (host, charger) is provided below. In the SMBwrite routine, the battery functions as a bus master so that messages can be sent. Generally, the first step is to determine whether the data bus is available (CheckBus Macro 700) in which the clock latch 110 is armed. If it is determined that the data bus is available, then the bus is readied for the start condition (BSTART macro 200). The battery then sends the data (e.g., slave address, command code) in the SendByte Macro 300. After each byte of data is sent, the routine checks as to whether the byte was acknowledged. After all bytes have been sent (the full message has been transmitted by the battery to the slave device, a stop condition performed (BSTOP Macro 600), the clock latch 110 is disarmed and the routine exited. If there are any errors or timeouts during this routine, the transmission is usually terminated.

As described above, the present invention provides a unique method of using external circuitry to latch the state of the bus when an event occurs and also to signal the bus of a busy condition by holding the bus line low to avoid missing transmissions. This SMBUS mastering/interface hardware 57 enables one to detect the bus idle condition. By arming the clock latch 110, software detects bus idle condition noting that no clock transition was occurred for 1 ms. By detecting idle condition bus mastering is started. This circuitry can automatically stretch the clock and capture data while arbitrating the bus in a multi-master environment. The latching nature of the SMBUS Mastering circuitry 57 is exploited in the interval between when the bus is checked for activity and the start of the BSTART routine 200. Generally described, prior to the data transmission, the bus is checked to see if a device is currently communicating on the bus. The clock latch 110 is armed to capture any transmissions that may occur. Then a check is made to determine whether a transmission is currently happening. If it is determined there is no communication, the routine is exited and the BSTART routine 200 is started. If a transmission occurs between the time it is determined the bus is idle and when the BSTART routine captures the bus, the SMBUS Mastering circuitry 57 will hold the bus in a BUSY condition until the transmission can catch up and be continued. Although there are two devices vying for control of the bus, the bus arbitration rules will determine who eventually wins control of the bus.

The SMBUS Mastering circuitry 57 is also used in the BITOUT routine 400 to capture the data (EventData line) that is sent and then hold the bus in a BUSY condition (clock latch and EventCapture line). This circuitry enables a smooth transition from the continuous domain of the bus to the discrete sampling domain of the microcontroller. This circuitry coupled with the firmware allows the battery to release the bus in the case of a collision or loss of arbitration.

Figure 6A:
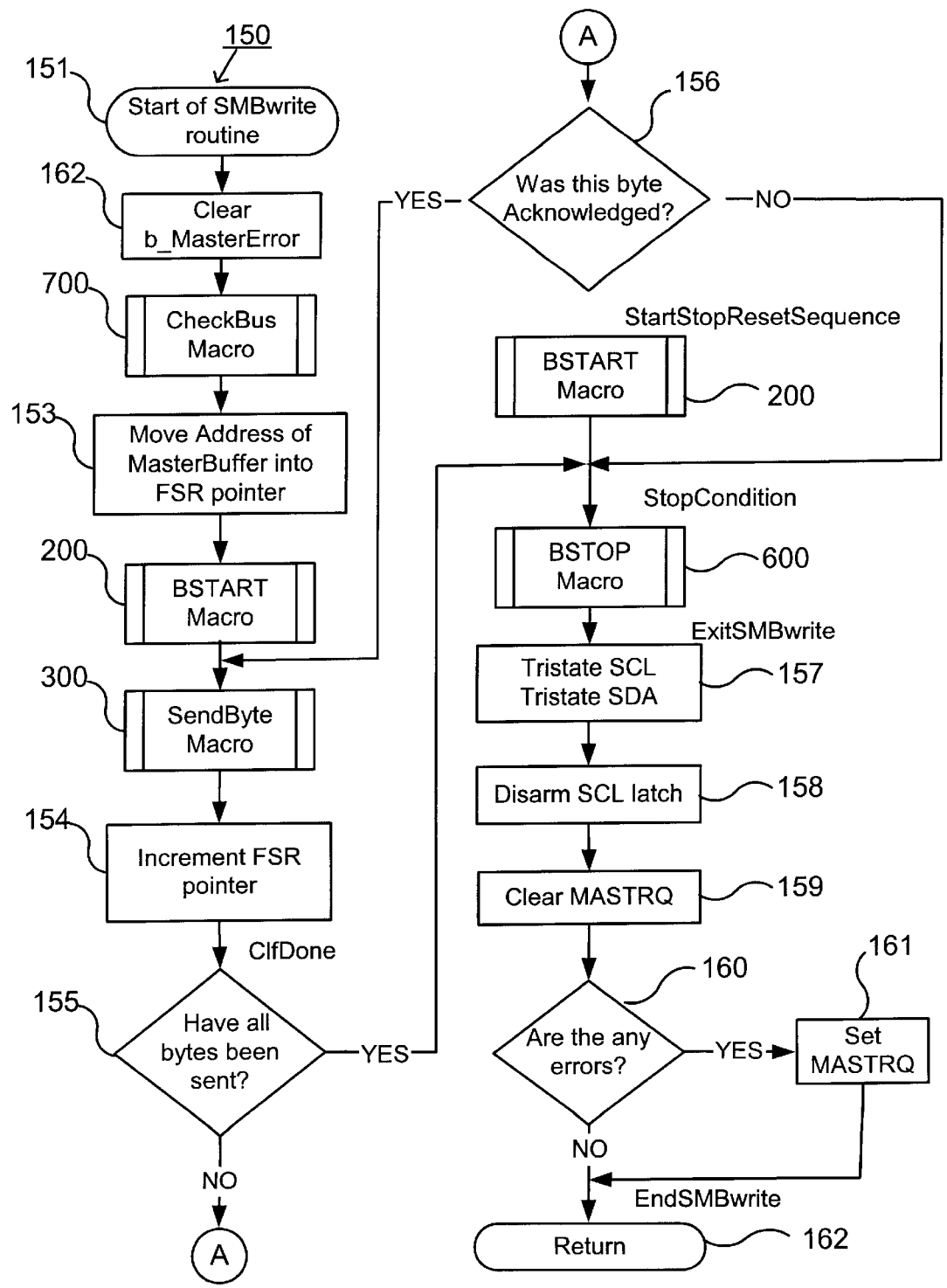
Figure 6B:
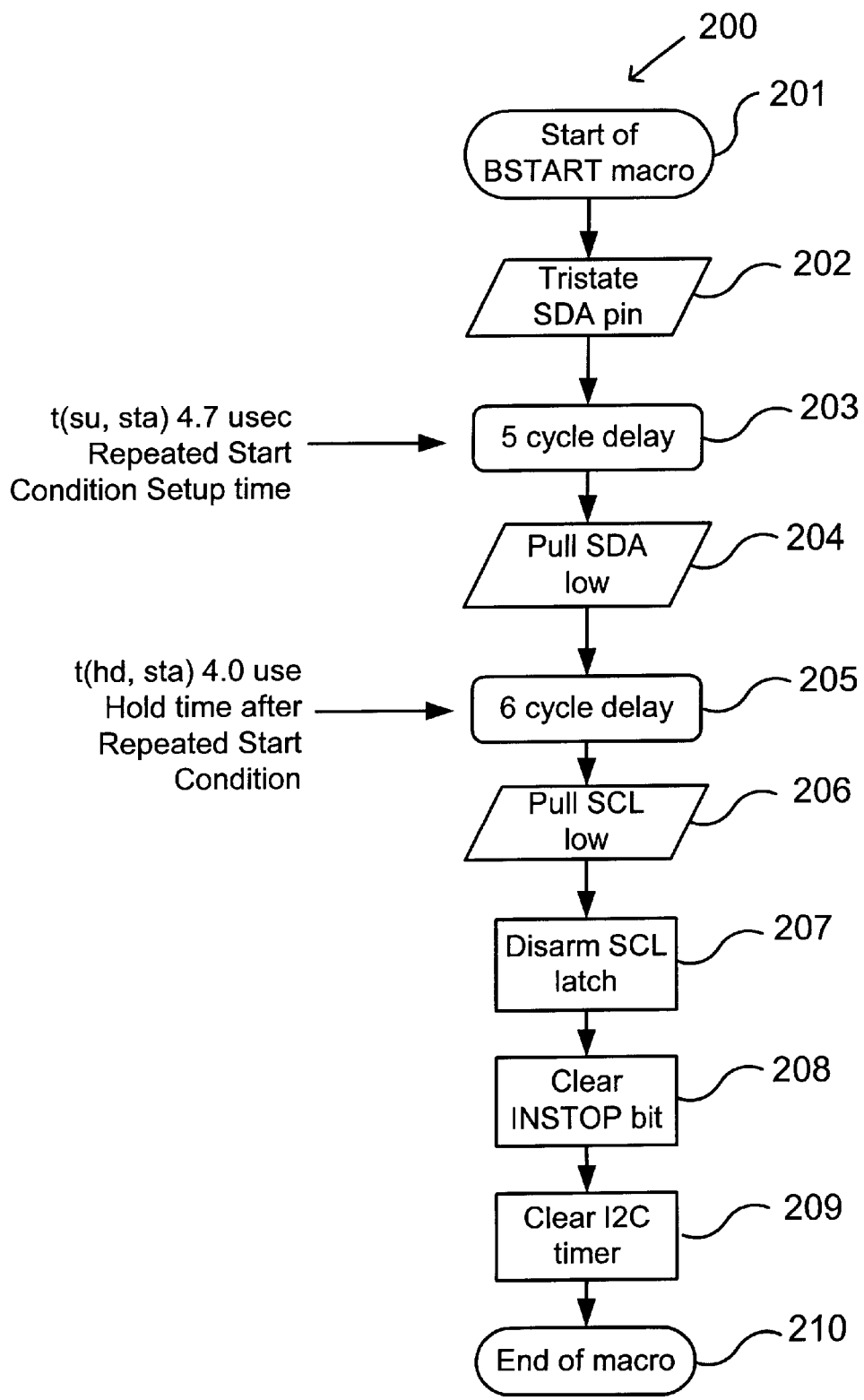

This feature is best described with reference to FIGS. 6B (BSTART routine 200) and 6G (CheckBus Macro 700). Specifically, with reference to FIG. 6G (CheckBus Macro 700), first the clock latch 110 is armed in step 702. Then the clock and data lines are checked in step 703 to see if they both are high which means the bus is idle. Then a timer variable is cleared (the 25 ms timer in step 704). Then a hardware bit inside the microcontroller is checked to see if the stop bit was detected last in step 705. A number of designs may rely only on that one idle check. However, there are quite a few conditions where the stop bit might not be sent last and then the battery would never be able to seize the bus until another device transmitted. Therefore, the present invention includes a secondary check, i.e., to check to see if the latch has occurred during this routine in step 707. Then, in the event the stop bit was somehow corrupted, a time period is waited in step 708 (e.g., 2 ms) using a timer variable, after which the battery assumes the bus is idle because such condition indicates that SMBUS specifications have been violated. The routine is then exited in step 709. At this time if it has been determined that the clock latch 110 is not latched, there has not been an external event.

This method is preferred because the polling sequence is slow and the latch is used to capture a synchronous event. It is also used when transitioning to the BSTART routine 200, because there is a period of time that a "start bit" could have been sent by another device. By using the latch, the battery is synchronizing itself with the other device (which does not necessarily mean the battery will win arbitration). The loop of the CheckBus Routine 700 ensures that the battery is synchronized, which could not be accomplished if the battery were merely polling the lines. Periodic polling would likely cause missed transmissions. This routine makes the assumption that when the loop is entered, both lines are high.

Whether they are or not does not matter because the latch would have latched the line shut.

In the BSTART Macro 200 (FIG. 6B), although a device may have started transmission, the tristate is keeping it high. This ensures that both clock and data output pins are tristated (open-circuit state/inactive) and ready for the start condition in step 202. After a certain cycle delay in step 203 (e.g., 5 cycle) the data line is then pulled low in step 204 while keeping the clock line high. After another certain cycle delay in step 205 (e.g., 6 cycle) the clock line is pulled low in step 206. That is considered to be a start condition which signals the entire bus that the battery is ready to transmit. After the clock line is pulled low in step 206, the clock latch can be disarmed in step 207 in the event another device tripped it. Then transmissions can begin, the arbitration of which is discussed hereafter. A typical transmission will send the Device Address it is communicating to, the address of the battery, and the data it is sending as described in the SMBUS Specification.

Turning now to the software flow diagrams of FIG. 6A, the SMBwrite Routine 150 will be described in detail with reference to each subroutine called therefrom. The SMBwrite Routine 150 begins with start block 151. The program flows to step 152 where the error bit (b_MasterError) is cleared and then the CheckBus Macro 700 is called to ensure no other master is transmitting on the bus. This idle bus condition is detected in the following way with reference to the CheckBus Macro 700 of FIG. 6G. The CheckBus Macro begins with start block 701. Then, the SCL latch 110 is armed at step 702 and the clock and data lines are checked at decision step 703 to ensure they are high (i.e., idle). If not, an error bit is set in b_MasterErrors to indicate the bus is not idle and the routine is exited at end block 709. If idle, a timer variable (tI2C) is cleared to zero at step 704. The stop bit is then detected at decision step 705. If the STOP bit in the I2CSTAT register (a status register defined in the SMBus Specification) is set, the bus is defined as idle and the transmission can continue by exiting the macro at end block 706, otherwise additional tests must be run to ensure this is a valid bus idle condition. In the latter case the clock latch 110 is examined at decision step 707 while the tI2C timer increments. If the clock latch 110 is set (i.e., an event occurred) then another master is transmitting on the bus, so the appropriate error bit (NotIdle bit) is set at step 710 in b_MasterErrors and the routine is exited at end block 709. However if the clock latch 110 remains clear and the tI2C variable reaches a predetermined time limit (e.g., 2 (~2 ms)) at step 708, the bus is confirmed to be idle and transmission can continue by exiting the routine at end block 709. Otherwise, until the timer variable reaches its predetermined limit, the routine loops back to decision step 705 to check the STOP bit. This routine provides redundancy checking and the latch allows synchronization.

Returning now to the SMBwrite routine 150 (FIG. 6A), after the CheckBus Macro 700 is completed, the address of MasterBuffer is moved into a pointer and then the BSTART macro 200 is called (FIG. 6B) to ensure that the data and clock lines are ready for the start condition. The BSTART Macro begins at start block 201. For master data transmissions, a START bit is sent by first tristating the data pin in the event of a repeated start condition. A delay (e.g., 5 cycle/4.7 microseconds) is waited in step 203. Then the data line is pulled low at step 204 while the clock line remains high. After another predetermined delay (e.g., 6 cycle/4 microseconds) at step 205, the clock line is also pulled low at step 206. The clock latch is then disarmed at step 207. The INSTOP bit and the tI2C (transmission timeout) timer are cleared at steps 208 and 209 in preparation for the byte transmission. The macro is then exited at end block 210.

Figure 6C:
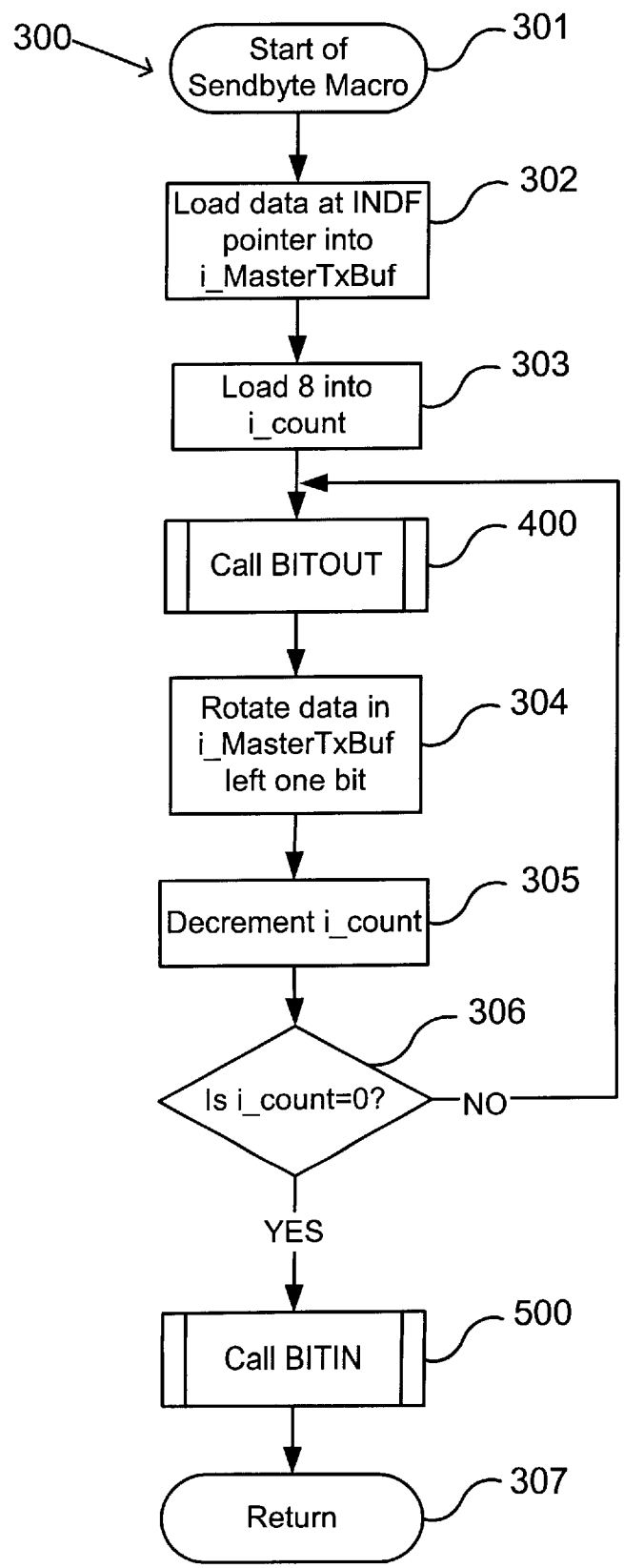

Returning back to the SMBwrite routine 150 (FIG. 6A) from the BSTART Macro 200, the next routine called is the SendByte Macro 300 (FIG. 6C). The SendByte Macro 300 begins at start block 301. First, data is loaded into the i_MasterTxBuf and rotated left 8 times in step 303 calling the BITOUT routine 400 (FIG. 6D discussed in more detail below) after each shift. By rotating, each bit in turn is sent a bit at a time. After 8 bits have been sent in steps 304 through 306, the BITIN routine 500 (FIG. 6E discussed in more detail below) is called to verify the message was acknowledged. The routine then exits at end block 307 and returns to the SMBwrite routine at step 154 where the file select register (FSR) pointer is incremented. The routine proceed to decision step 155 where it is determined whether all bytes have been sent. If so, the routine generates a stop condition with the BSTOP Macro 600 (discussed in more detail below). Then the clock and data lines are released high (open-circuit state/inactive) at step 157 and the clock latch is disarmed at step 158. The error bit MASTRQ is cleared at step 159. The program proceeds to decision step 160 where the program checks for errors. If there were any errors MASTRQ is set at step 161. Otherwise, if there were no errors, the MASTRQ bit remains clear to signify a successful transmission. the routine ends at end block 162.

If all of the bytes have not been sent as determined in decision step 155 of the SMBwrite routine 150, the routine proceeds to decision step 156 to determine whether the byte was acknowledged. If the byte was acknowledged, the routine branches back to the SendByte Macro 300 and the transmission continues. Otherwise a STOP condition is transmitted (BSTOP Macro 600). Then the clock and data lines are released high (open-circuit state/inactive) at step 157 and the clock latch is disarmed at step 158. The error bit MASTRQ is cleared at step 159. The program proceeds to decision step 160 where the program checks for errors. If there were any errors, MASTRQ is set at step 161. Otherwise, if there were no errors, the MASTRQ bit remains clear to signify a successful transmission. the routine ends at end block 162.

As referenced above, the BITOUT Macro 400 (FIG. 6D) called from the SendByte Macro 300 begins at start block 401. The bit transmission consists of outputting the value of Most Significant Bit of i_MasterTxBuf on the data line in step 402. The clock latch is then armed in step 403 in the event another master is transmitting and the clock output line is released high in step 404 (clock line held low previously). The PulseClock routine 800 (FIG. 6H discussed in more detail below) is called and upon return from PulseClock 800, the program proceeds to decision block 405 for SMBUS timeout determinations.

The SMBUS specification establishes a time period (called "TIMEOUT") that the SCL (clock) line may be held low as a "BUSY" indication. The minimum time in the specification is 25 milliseconds (msec) and while the maximum time is 35 msec. These SMBUS TIMEOUT specifications are important limits on how much bus bandwidth a device may use.

Instead of selecting a single value between the minimum and maximum so that a device will timeout when any clock low exceeds the chosen value, the present invention has defined two parameters (thresholds) in the code. One is "TimeOut" which indicates a device has exceeded the minimum, e.g., 25 msec limit while the other is "Hung"

which indicates a device has exceeded the maximum, e.g., 35 msec limit. As described in the flowchart for the BITOUT Macro 400 (FIG. 6D), if the device is Hung, the Smart Battery Master routines release both the data and clock line high and exit the routine. If however, the device releases the bus in the Timeout area (25 ms<Release Time<35 ms), the Mastering routines will generate a Start then a Stop sequence to reset the SMBUS then exit the routine.

This pair of values provides a "window" to diagnose when the device actually timed out. This method basically elongates the SMBUS Timeout. For example, when a device holds the clock line low exceeding 25 ms, a timer begins counting. If the clock line was not released within 25 ms, a Timeout bit is set, but no further action is taken. However, if the device continued to hold the line low past 35 ms, then it is considered a "Hung" condition. This method allows the exact time of release to be determined, whether it be 27 ms 28 ms, etc. This provides a "window" into the communications to know when a device exceeded the first limit and released during the window. The alternative of having 25 ms Timeout would be too strict and having 35 ms would not be strict enough. The extra 10 ms is the maximum allowable window to comply with the Specifications.

Figure 6D:
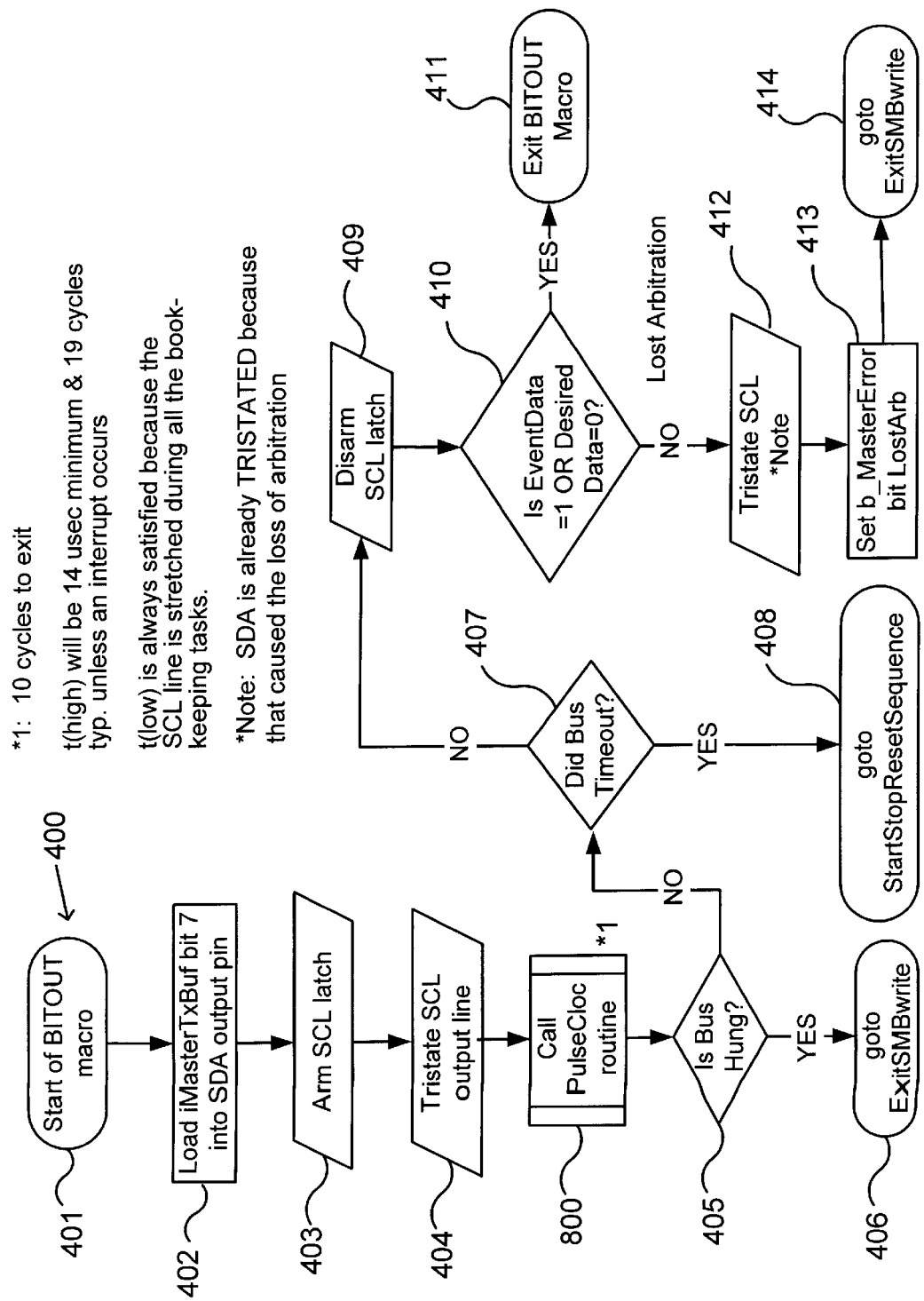
Figure 6E:
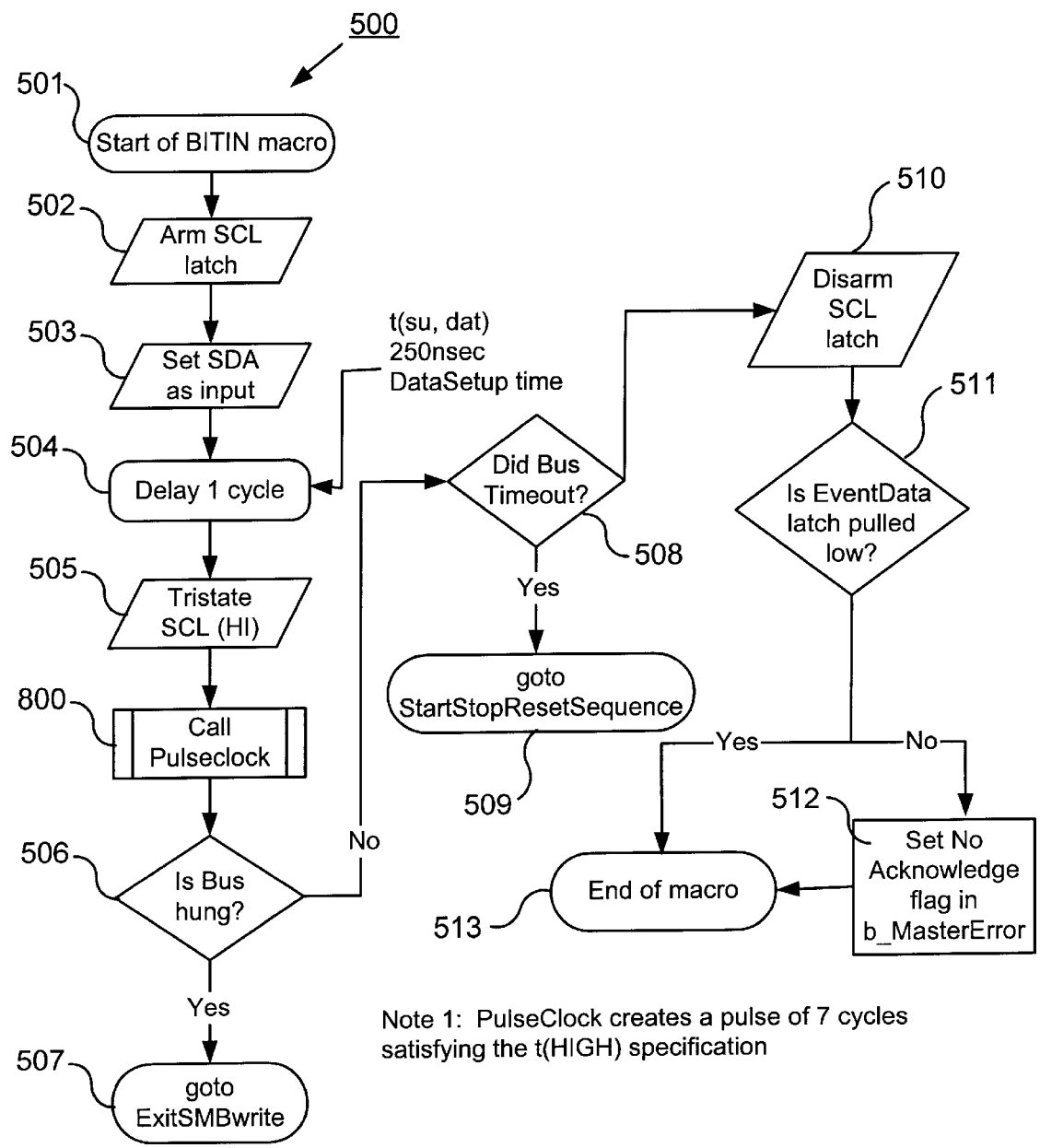
Figure 6F:
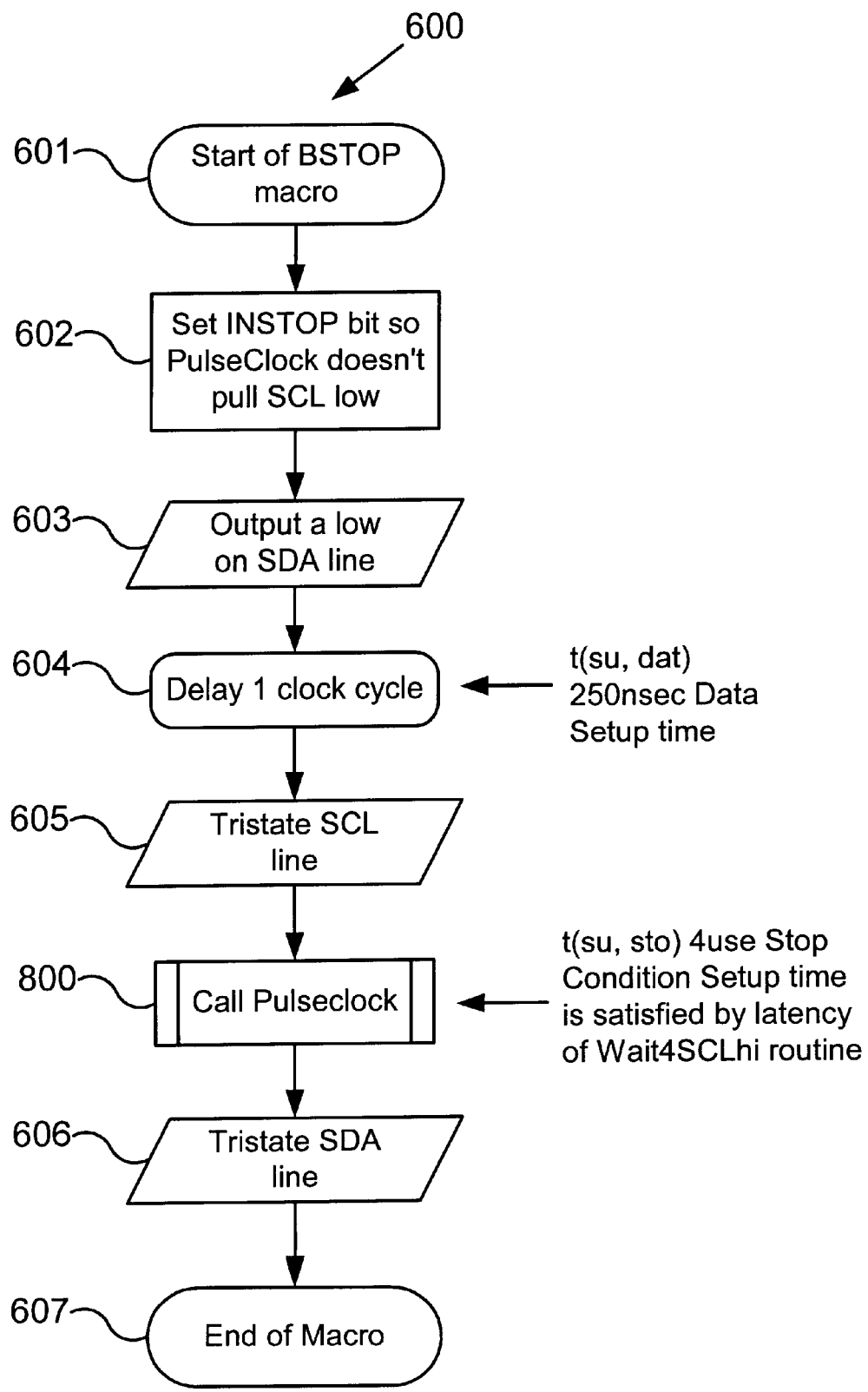
Figure 6G:
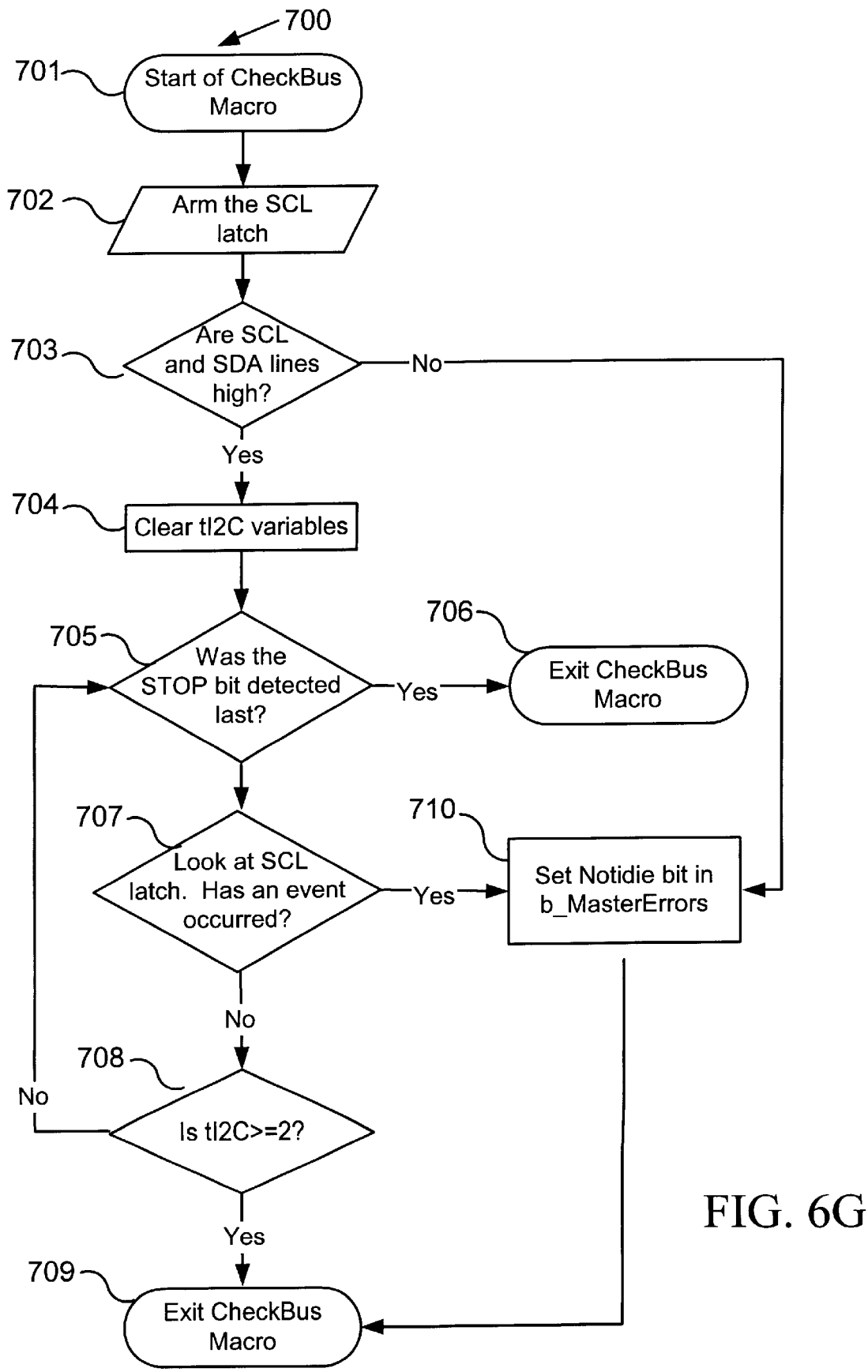

Turning back to the discussion of FIG. 6D (BITOUT Macro 400) this two threshold method of elongating the TIMEOUT is described. The program proceeds to decision block 405 to determine whether the Bus Hung bit is set (signaling a hung bus condition i.e., exceeding SMBUS TIMEOUT maximum threshold of 35 msec.). If the bus if hung, the routine exits at end block 406 and goes to ExitSMBwrite in the SMBwrite routine at step 157. If the bus is not hung, (i.e., has not exceeded the maximum threshold for SMBUS TIMEOUT), the program proceeds to decision block 407 to determine whether the bus exceeded the minimum threshold of the SMBUS TIMEOUT (e.g., 25 msec.). If the Bus Timeout bit is set in step 407, the program proceeds to the StartStopResetSequence where a Start bit is sent followed shortly by a Stop bit in step 408. This will reset the devices on the bus (when a device held the bus too long). The program then branches to step 200 of the SMBwrite routine which calls the BSTART Macro.

If no errors are detected in decision steps 405 and 407, the clock latch is disarmed in step 409 and the EventData latch is examined in decision step 410 to determine whether the data that was transmitted matches the desired data. If not, another master is on the bus and has won arbitration and the battery has lost arbitration. Arbitration (FIG. 6D) consists of the master transmitting a bit in step 402 then checking to ensure its data was actually sent in step 410. The master transmitting a "0" when another master transmits a "1" will win the arbitration. The losing master must cease transmitting and release the bus without interrupting/disturbing the other master's transmission. This is an SMBUS requirement for arbitration that "0" always wins. In a typical transmission, the bit to be sent is loaded into the data output pin in step 402 then the SCL latch is armed in step 403. If a transmission occurs then the clock latch will latch it. Then the clock output line is tristated (open-circuit state/inactive) in step 404 which allows it to go high. The PulseClock routine 800 is called as previously described with reference to FIG. 6H. The Timeout period (25–35 msec.) is then checked as previously described. If there is not a Timeout or hung condition of the bus, the SCL latch is disarmed in step 409. Then the latch that has the data is checked in decision step 410 and if the data is not what was expected, then arbitration has been lost. If arbitration is lost (data not what expected) the clock line is released high (open-circuit state/ inactive) in step 412 (the data line is already tristated because that caused the loss of arbitration) and the LostArb bit of the MasterErrors byte is set in step 413 in preparation for an exit at branch 414 which proceeds to ExitSMBwrite at step 157 of SMBwrite routine 150. If arbitration is won (the transmitted data matches the desired data in decision step 410), the BITOUT macro is exited in end block 411 and returns from where it was called in the SendByte Macro 300.

Figure 6H:
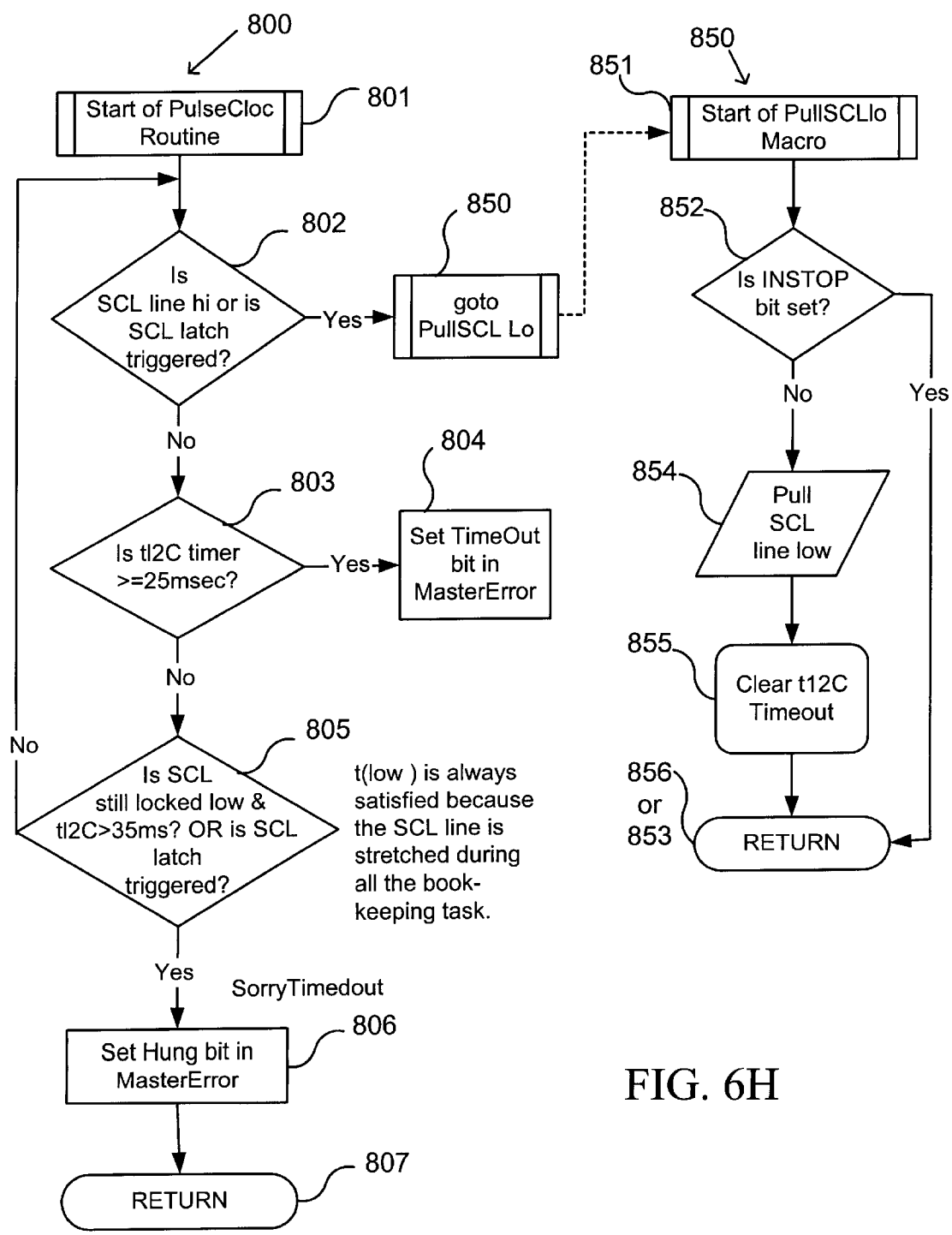

As referenced above, the BITIN Macro 500 (FIG. 6E) called from the SendByte Macro 300 begins at start block 501. In the BITIN Macro 500, the clock latch is armed in step 502, the data line is set as input in step 503, a predetermined delay is waited at step 504 and the routine tristates the clock output line (open-circuit state/inactive) in step 505, and calls the PulseClock macro 800 (FIG. 6H). The PulseClock creates a pulse of 7 cycles satisfying the t(HIGH) specification. The program proceeds to decision block 506 to determine whether the Bus Hung bit is set (signaling a hung bus condition i.e., exceeding SMBUS TIMEOUT maximum threshold of 35 msec.). If the bus if hung, the routine exits at branch 507 and goes to ExitSMBwrite in the SMBwrite routine at step 157. If the bus is not hung, (i.e., has not exceeded the maximum threshold for SMBUS TIMEOUT), the program proceeds to decision block 508 to determine whether the bus exceeded the minimum threshold of the SMBUS TIMEOUT (e.g., 25 msec.). If the Bus Timeout bit is set in step 508, the program proceeds to the StartStopResetSequence where a Start bit is sent followed shortly by a Stop bit in step 509. This will reset the devices on the bus (when a device held the bus too long). The program then branches to step 200 of the SMBwrite routine which calls the BSTART Macro. If the bus has not timed out and is not hung in steps 506 and 508, the clock latch is released in step 510, and the EventData latch is checked in decision step 511 to determine whether the latch is pulled low. If so, the macro is exited at end block 513. If not, the "No Acknowledge" flag is set in b_MasterErrors and then the routine is exited at end block 513.

The PulseClock Macro routine 800 (FIG. 6H) begins at start block 801. This routine loops until either the clock line is released high in decision step 802, the SCL latch is triggered in decision step 802, or the tI2C timer increments up to 35 (~35 msec) in step 805. If tI2C increments up to 25 in step 803, the TimeOut error bit is set in step 804. If the clock line is released high or the clock latch is triggered within the 35 msec period (maximum threshold for bus hung condition) in step 802, the program branches to the PulISCLlo macro 850 (FIG. 6H). If tI2C exceeds 35 in step 805, the Bus Hung error bit is set in the b_MasterErrors in step 806 and the routine is exited in step 807.

The PulISCLlo Macro 850 (FIG. 6H) begins at start block 851. This routine proceeds to decision step 852 where it determines whether a Stop condition should be sent (is INSTOP bit set?) and if so returns immediately in step 853. Otherwise, the clock line is again pulled low in step 854 to allow time for the next bit to be queued up. The tI2C Timeout bit is cleared in step 855 and the macro returns in step 856.

In the BSTOP macro 600 (FIG. 6F) called from the SMBwrite routine 150 begins at start block 601. In this routine, a STOP condition is sent as a rising data line while the clock line is high. First, the INSTOP bit is set to indicate the STOP condition is being sent in step 602. The data line is pulled low in step 603 and after a short delay in step 604, the clock output line is released high (open-circuit state/ inactive) in step 605. The PulseClock routine 800 (FIG. 6H) is called to wait for the clock line to be released if another device is holding it low. Upon the return from PulseClock 800, the data output line is tristated (open-circuit state/inactive) in step 606 and the BSTOP routine is exited in end block 607.

While the invention has been particularly shown and described with respect to the preferred embodiments thereof, it will be understood by those skilled in the art that the foregoing and other changes in form and details may be made therein without departing from the spirit and scope of the appended claims.

We claim:

1. A method for writing data to a serial bus from a smart battery acting as a bus master, said serial bus having a data line and a clock line, and said smart battery having an error register in which all error bits therein have been initially cleared, comprising the steps of:

(a) checking the bus for an idle condition, including the step of first arming a clock latch to capture any transmissions which may occur on the clock line;

(b) generating a start condition;

(c) sending a byte of data;

(d) checking whether the byte was acknowledged;

(e) if the byte was acknowledged, repeating steps (c) and (d) until all bytes have been sent;

(f) performing a stop condition;

(g) tristating the clock and data lines;

(h) disarming the clock latch;

(i) registering occurrence of errors in any of steps (a)–(h) in said error resister; and (j) if any errors are registered in said error register, terminating transmission.

2. The method of claim 1 wherein step (a) of checking the bus for an idle condition comprises, after the step of arming the clock latch, the substeps of:

(a1) checking the clock and data lines of the bus for an idle condition;

(a2) if either the clock line or the data line are not idle, registering an error in said error register and skipping steps (a3)–(a8);

(a3) clearing a timer;

(a4) checking the clock and data lines of the bus for a stop condition to signify the bus is idle;

(a5) if said stop condition was detected in step (a4), skipping steps (a6)–(a8);

(a6) checking clock latch for any transmissions;

(a7) if a transmission occurred, registering an error in said error register and skipping step (a8); and (a8) returning to step (a4) until said timer reaches a predetermined limit.

3. The method of claim 1 wherein step (b) of generating a start condition comprises the substeps of:

(b1) tristating the clock and data lines to ensure that both lines are ready for the start condition;

(b2) after a predetermined delay, pulling the data line low;

(b3) after another predetermined delay, pulling the clock line low;

(b4) disarming the clock latch; and (b5) clearing a timer.

4. The method of claim 1 wherein step (c) of sending a byte of data comprises the substeps of:

(c1) loading the byte of data into a buffer;

(c2) loading a bit from the buffer into the data output pin;

(c3) repeating step (c2) for all bits; and (c4) verifying the byte of data was acknowledged.

5. The method of claim 4 wherein step (c2) of loading the bit from the buffer into the data output pin comprises the substeps of:

(i) arming the clock latch;

(ii) tristating the clock line;

(iii) pulsing the clock;

(iv) if a bus timeout variable has exceeded a maximum threshold value, releasing control of said bus and return to said step (g) of claim 2; else if the bus timeout variable has exceeded a minimum threshold value, resetting said bus and returning to said step (f) of claim 2; else disarming the clock latch;

(v) if a data latch electrically coupled to the data line signifies no transmissions have occurred or if desired data corresponds to the loaded data bit skip to step (vi); else tristate the clock line to signify that arbitration has been lost and record an error in said error register for lost arbitration and return to step (g) of claim 2; and (vi) returning to said step (c3).

6. The method of claim 5 wherein step (iii) of pulsing the clock comprises the substeps of:

(1) checking the clock line for a high condition or the clock latch for triggering;

(2) if either condition in step (1) has been met, checking for a stop condition; wherein if a stop condition has not occurred, pulling the clock line low, clearing the bus timeout variable, and skipping steps (3)–(5); and wherein if a stop condition has occurred, skipping steps (3)–(5);

(3) if the bus timeout variable has exceeded a minimum threshold value, registering an error in said error register;

(4) if the bus timeout variable has exceeded a maximum threshold value and the clock line remains low, or if the clock latch is triggered, registering an error in said error register and skipping step (5); and (5) repeating steps (1) through (4).

7. The method of claim 4 wherein step (c4) of verifying the byte of data was acknowledged comprises:

(i) arming the clock latch;

(ii) setting the data line as input;

(iii) waiting a predetermined delay for data setup time;

(iv) tristating the clock line;

(v) pulsing the clock;

(vi) if a bus timeout variable has exceeded a maximum threshold value, releasing control of said bus and return to step (g) of claim 2; else if the bus timeout variable has exceeded a minimum threshold value, resetting said bus and returning to step (f) of claim 2; else disarming clock latch;

(vii) if a data latch electrically coupled to the data line signifies no transmissions have occurred, recording of an error in said error register.

8. The method of claim 7 wherein step (v) of pulsing the clock comprises the substeps of:

(1) checking the clock line for a high condition or the clock latch for triggering;

(2) if either condition in step (1) has been met, checking for a stop condition; wherein if a stop condition has not occurred, pulling the clock line low, clearing the bus timeout variable, and skipping steps (3)–(5); and wherein if a stop condition has occurred, skipping steps (3)–(5);

(3) if the bus timeout variable has exceeded a minimum threshold value, registering an error in said error register;

(4) if the bus timeout variable has exceeded a maximum threshold value and the clock line remains low, or if the clock latch is triggered, registering an error in said error register and skipping step (5); and (5) repeating steps (1) through (4).

9. The method of claim 1 wherein step (f) of performing a stop condition comprises the substeps of:

(f1) setting a stop bit for a stop condition;

(f2) outputting a low on the data line;

(f3) delaying a predetermined amount of time for data setup;

(f4) tristating the clock line;

(f5) pulsing the clock; and (f6) tristating the data line.

10. The method of claim 9 wherein step (f5) of pulsing the clock comprises the substeps of:

(1) checking the clock line for a high condition or the clock latch for triggering;

(2) if either condition in step (1) has been met, checking for a stop condition; wherein if a stop condition has not occurred, pulling the clock line low, clearing the bus timeout variable, and skipping steps (3)–(5); and wherein if a stop condition has occurred, skipping steps (3)–(5);

(3) if the bus timeout variable has exceeded a minimum threshold value, registering an error in said error register;

(4) if the bus timeout variable has exceeded a maximum threshold value and the clock line remains low, or if the clock latch is triggered, registering an error in said error register and skipping step (5); and (5) repeating steps (1) through (4).

11. The method of claim 5 wherein the step of resetting the bus in step (iv), comprises the substeps of:

(1) tristating the clock and data lines to ensure that both are ready for the start condition (2) after a predetermined delay, pulling the data line low;

(3) after another predetermined delay, pulling the clock line low;

(4) disarming the clock latch; and (5) clearing a timer.

12. The method of claim 7 wherein the step of resetting the bus in step (vi), comprises the substeps of:

(1) tristating the clock and data lines to ensure that both are ready for the start condition;

(2) after a predetermined delay, pulling the data line low;

(3) after another predetermined delay, pulling the clock line low;

(4) disarming the clock latch; and (5) clearing a timer.

13. A storage medium for a smart battery having stored thereon sequences of instructions which, when executed by a processor, cause the processor to perform the steps of claim 1.

14. The storage medium of claim 13 further including sequences of instructions which, when executed by the processor, cause the processor to perform the substeps of claim 3.

15. In a smart battery system comprising a microcontroller and a serial bus for communications, said microcontroller having a data pin electrically connected to a data line of said serial bus and having a clock pin electrically connected to a clock line of said serial bus, a method of loading a data bit from the microcontroller to the data line with multi-master arbitration comprising the steps of:

(a) loading a data bit into the data pin of the microcontroller;

(b) arming a clock latch electrically coupled to the clock line to latch any device transmissions which may occur;

(c) tristating the clock pin;

(d) pulsing a clock signal on the clock line;

(e) if a device on the bus has exceeded a maximum threshold value for pulling the clock line low, releasing control of said bus by said smart battery; else if a device on the bus has exceeded a minimum threshold value for pulling the clock line low, resetting the bus by said smart battery; else disarming the clock latch; and (f) if a data latch electrically coupled to the data line signifies no transmissions have occurred or if desired data corresponds to the loaded data bit do not record an error; else tristate the clock line to signify that arbitration has been lost and record an error in an error register for lost arbitration.

16. The method of claim 15 wherein step (d) of pulsing the clock comprises the substeps of:

(d1) checking the clock line for a high condition or the clock latch for triggering;

(d2) if either condition in step (d1) has been met, checking for a stop condition; wherein if a stop condition has not occurred, pulling the clock line low, clearing a timer variable, and skipping steps (d3)–(d5); and wherein if a stop condition has occurred, skipping steps (d3)–(d5);

(d3) if the timer variable has exceeded a minimum threshold value, registering an error in said error register;

(d4) if the timer variable has exceeded a maximum threshold value and the clock line remains low, or if the clock latch is triggered, registering an error in said error register and skipping step (d5);

(d5) repeating steps (d1) through (d4).

17. A storage medium for a smart battery having stored thereon sequences of instructions which, when executed by a processor, cause the processor to perform the steps of claim 15.

18. The storage medium of claim 17 further including sequences of instructions which, when executed by the processor, cause the processor to perform the substeps of claim 16.

19. In a smart battery system comprising a microcontroller and a serial bus for communications, a system for multi-master arbitration comprising:

(a) a data pin electrically connected to a data line of said serial bus;

(b) a clock pin electrically connected to a clock line of said serial bus;

(c) means for loading a data bit into the data pin of the microcontroller;

(d) a clock latch electrically coupled to the clock line to latch any device transmissions which may occur;

(e) a data latch electrically coupled to the data line to latch any device transmissions which may occur;

(f) means for arming the clock latch;

(g) means for tristating the clock pin;
(h) means for pulsing a clock signal on the clock line;
(i) means for releasing control of the bus by the smart battery if a device on the bus has exceeded a maximum threshold value for pulling the clock line low;
(j) means for resetting the bus by said smart battery if a device on the bus has exceeded a minimum threshold value for pulling the clock line low;
(k) means for disarming the clock latch if a device on the bus has not exceeded a minimum threshold value for pulling the clock line low;
(l) means for tristating the clock line if the data in the data latch does not correspond to the loaded data bit and
(m) means to signify that arbitration has been lost when the clock line is tristated.

* * * * *